May 29, 1956   M. L. EDWARDS   2,747,514
SCAVENGE LINE CENTRIFUGE
Original Filed April 3, 1944   2 Sheets-Sheet 1
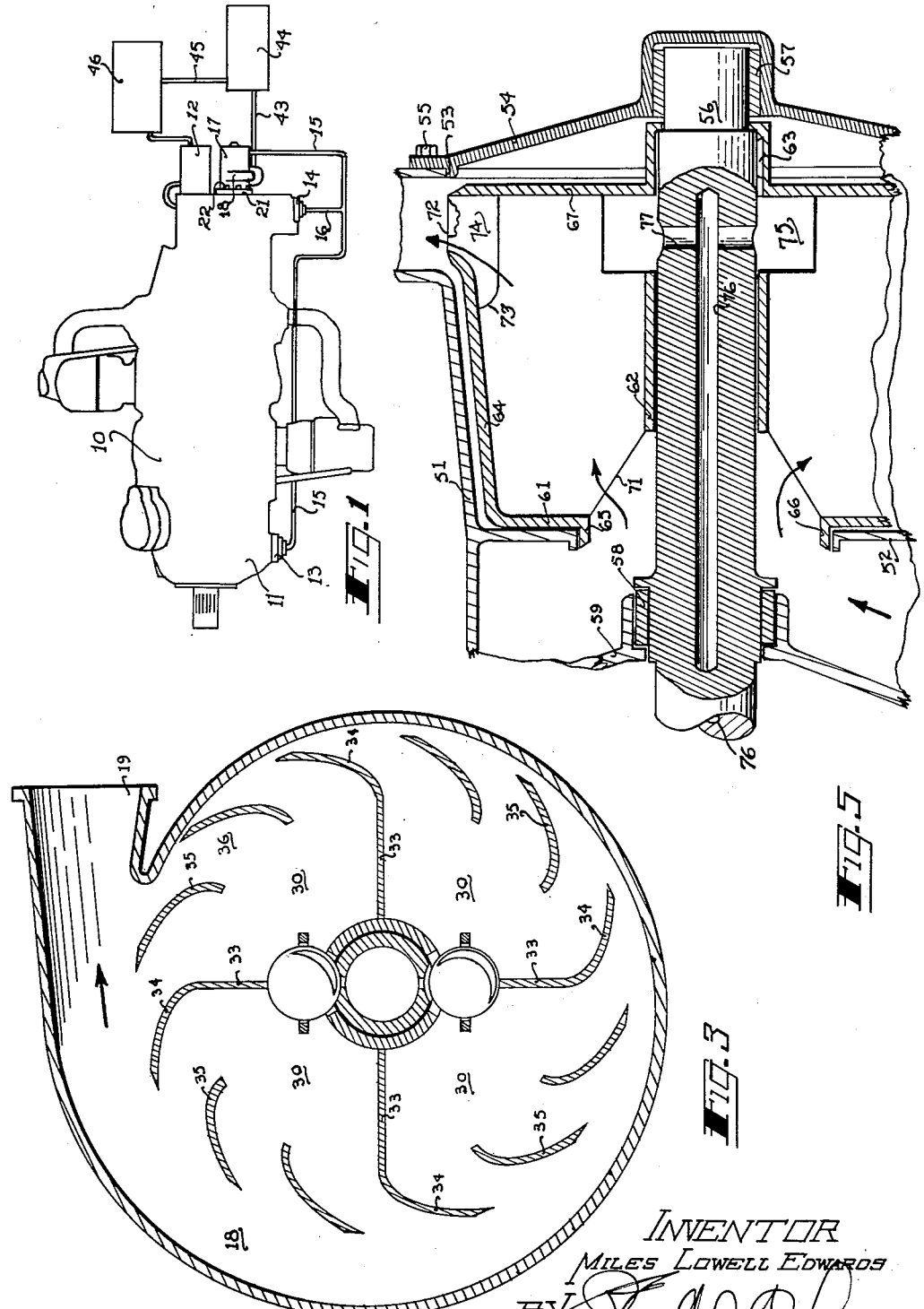

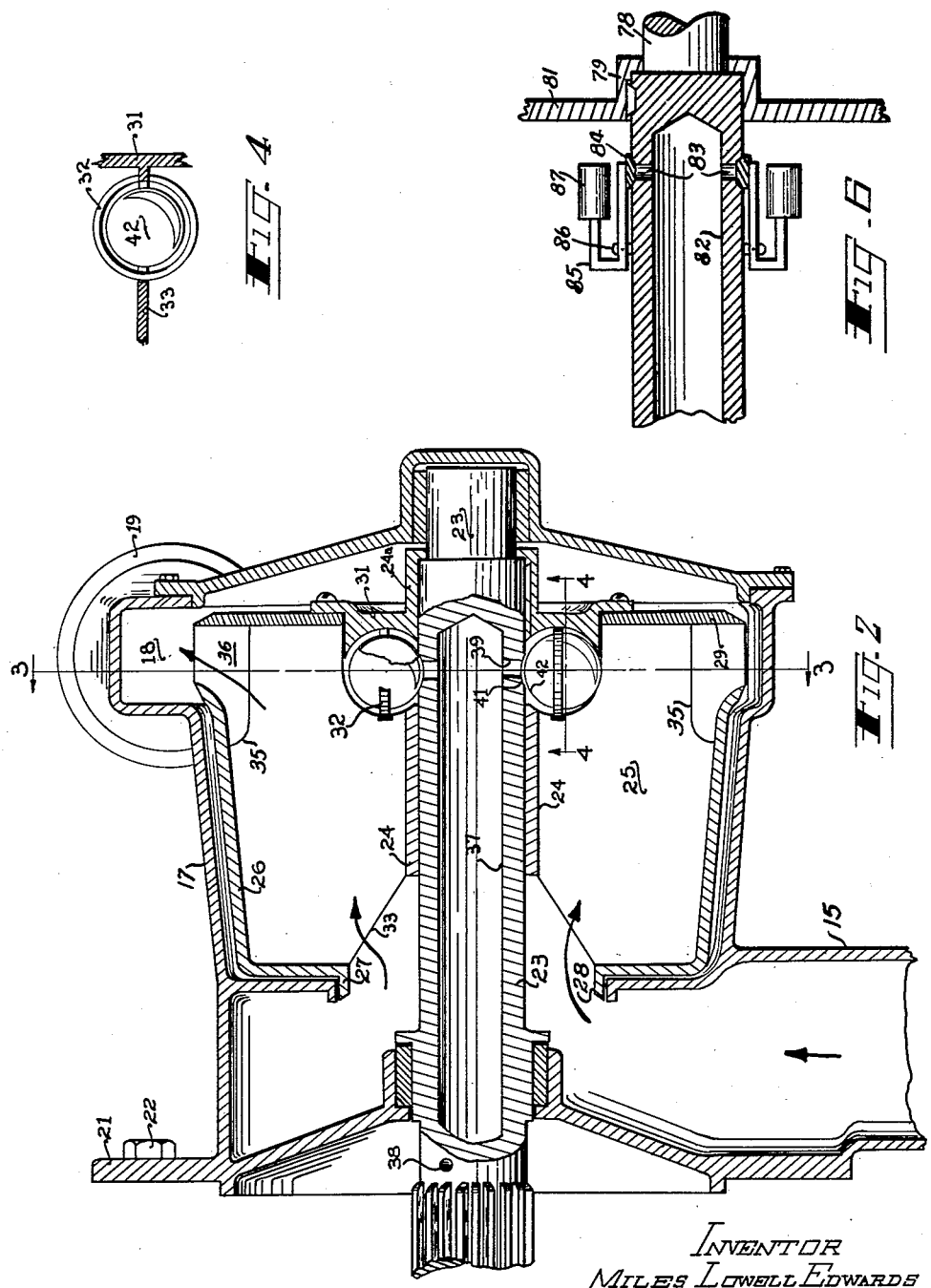

United States Patent Office 2,747,514
Patented May 29, 1956

---

2,747,514

SCAVENGE LINE CENTRIFUGE

Miles Lowell Edwards, Portland, Oreg.

Continuation of abandoned application Serial No. 529,372, April 3, 1944. This application July 22, 1952, Serial No. 300,161

7 Claims. (Cl. 103—113)

This invention relates to the separation of fluids of different specific gravities such as found in an admixture of gaseous fluids and liquids, and has particular reference to a new and improved centrifuge for separating the gaseous and liquid components of fluids delivered to the centrifuge under pressure.

This application is a continuation of application Serial No. 529,372, filed April 3, 1944, for Scavenge Line Centrifuge now abandoned.

The drawings illustrate the invention as embodied in a centrifuge adapted to be mounted in the discharge line from the scavenge pumps of an aircraft engine for separating air from the oil delivered from the scavenge pumps to the oil storage tanks.

In aircraft engines lubricating oil from an oil storage tank is supplied under pressure to the several moving parts of the engine by an oil pump. The oil flows from the several bearings and other lubricated surfaces and collects in the engine crank case. Sumps are provided in the crank case, and for each sump a scavenge pump is provided for withdrawing the oil from the sump and returning it by way of an oil cooler to the oil storage tank. Oil from the oil storage tank flows to the oil pump to be redelivered to the aircraft engine.

In the lubricating oil circuit for aircraft engines the scavenge pumps are of greater capacity than required for the normal flow of oil through the system. The reasons for utilizing scavenge pumps having a capacity in excess of the normal requirements of the lubricating system are two-fold: Each time the engine ceases operation a large quantity of oil drains from the various parts of the engine and collects in the crank case. It is important that this oil be removed from the crank case as quickly as possible upon starting the engine. To do this quickly the scavenge pumps must have pumping capacity substantially greater than that which would be required to carry the normal flow of oil after the excess volume of oil in the crank case has been removed.

A second reason for employing scavenge pumps of greater capacity than is needed for normal operations is that during the varying attitudes of an aircraft during flight all of the oil may drain to one end or the other of the crank case, as when the nose of the craft is elevated as in climbing, or depressed as in diving. It is customary to provide two, and in some cases more, scavenge pumps, one of said pumps having its inlet conected to one portion of the crank case and the other of said pumps having its inlet connected to a different portion of the crank case, so that as the craft is tilted, as in ascending or descending movements, the low point in the crank case will always be drained to one or the other of the scavenge pumps. For this reason, instead of providing pumps having a total combined capacity sufficient to withdraw the normal flow of oil from the crank case, each of the scavenge pumps must have capacity sufficient to remove all of the oil entering the crank case, since during ascending or descending movements of the craft all of the oil may be delivered to one or the other of the pumps.

Scavenge pumps for aircraft engines are usually of the displacement type, and each pump is in continuous operation during periods of operation of the aircraft engine. Since each of the pumps is of greater capacity than is necessary to withdraw the normal flow of oil from the crank case, considerable quantities of air are introduced into the discharge lines through which the oil is returned to the oil storage tank. The oil discharged by the scavenge pumps is passed through a cooling apparatus for cooling the oil prior to returning it to the oil storage tank. As the temperature of the oil is reduced, the pressure of the oil is correspondingly relieved and the air present in the oil lines may become dissolved in the oil or entrained therein in finely divided particles. Thereafter, as the pressure in the oil storage tank is reduced, as when the aircraft ascends to a higher altitude, the particles of air carried in the oil tend to expand and produce foam. The presence of foam produces a condition in the oil pump and oil lines leading to the various parts of the aircraft engine analogous to air binding. Moreover, the increased volume created by the admixture of the air with the oil is productive of greater friction losses in the oil lines, so that to provide for centrifuging the oil discharged from the scavenge pumps for removing the air therefrom is materially to enhance the efficiency of operation of the lubricating system.

It is, therefore, an object of the invention to provide a centrifuge for removing air or other gaseous fluids from the liquid in a pressure line.

It is a further object of the invention to provide a centrifuge for separating the gaseous and liquid components of fluid under pressure while maintaining the pressure on the liquid component of the fluid.

It is a further object of the invention to provide means embodying a centrifuge for separating the gaseous and liquid components of fluid under pressure and for removing the gaseous component of the fluid from the pressure area.

It is a further object of the invention to provide means embodying a centrifuge for separating the gaseous and fluid components of fluid under pressure and allowing the gaseous component of the fluid to flow to atmosphere while maintaining the pressure on the liquid component of the fluid.

It is a further object of the invention to provide means embodying a centrifuge for separating the gaseous and liquid components of an admixture of such components, allowing the gaseous component of the fluid to flow to atmosphere while delivering the liquid component of the fluid under substantially a predetermined pressure.

It is also an object of the invention to provide a centrifuge having a passage through which the gaseous component of the fluids entering the centrifuge may escape from the pressure area of the centrifuge to a prescribed point of discharge.

It is an object of the invention to provide a centrifuge for removing air and gases from a liquid pressure line wherein a centrifugally operated valve permits the flow of said gases from the pressure area, and wherein said centrifugally operated valve is dependent upon the buoyancy of said liquid for closure of said valve to prevent losses of said liquid.

Specifically, it is an object of the invention to provide in the discharge line from the various scavenge pumps of an aircraft engine means for centrifugally removing air from the oil discharged by said pumps and allowing the air to return to the engine crank case while, at the same time, delivering the oil to an oil storage tank at the pressures developed by the scavenge pumps.

More specifically, it is an object of the invention to provide in the discharge line from the various scavenge pumps of a prime mover engine means for centrifuging the admixture of air and oil delivered by said pumps, separating the air from the oil, and allowing the air to flow to atmosphere while, at the same time, delivering the oil under substantially the pressure developed by said pumps to a place of further use in the lubricating system of said engine.

The drawings illustrate the invention as embodied in a scavenge line centrifuge for use in the lubricating system of aircraft engines. It is to be understood, however, that the invention is not limited in its application to the details of construction and arrangement of parts illustrated in the accompanying drawings, nor as described in the following specification, since the invention is capable of other applications and of being practiced or carried out in various ways. The terminology employed herein is for the purpose of description and not of limitation, it being understood that various changes in form, proportion, size and details of construction within the scope of the claims may be resorted to without departing from the spirit or sacrificing any of the advantages of the invention.

In the drawings: Figure 1 is a diagrammatic illustration of the lubricating system for a prime mover engine of the type employed in aircraft, and showing a centrifuge mounted in the discharge line from the scavenge pumps of the engine; Figure 2 is a longitudinal sectional view of a centrifuge embodying the invention; Figure 3 is a transverse section taken on the line 3—3 of Figure 2; Figure 4 is a sectional view of the ball valve and cage taken on the line 4—4 of Figure 2; Figure 5 is a longitudinal view, partly in section, of a centrifuge type booster pump embodying a modification of the construction shown in Figure 2; and Figure 6 is a fragmentary detail of a valve mechanism in a device embodying a further modification of the construction shown in Figure 2.

Referring to Figure 1 of the drawings, there is shown a diagrammatic illustration of a lubricating system for an internal combustion engine of the type employed in aircraft, comprising an internal combustion engine 10 having a crank case 11 into which oil may flow from the various and several parts of the engine during periods of operation when the oil is supplied to the engine by the lubricating oil pump 12, or during periods of idleness when the oil drains from the engine parts and collects in the crank case 11. For the reason that during the flight of an aircraft oil may drain first to one portion of the crank case 11 and then to another portion of the crank case, according to the attitude of the aircraft or the angle at which it is tilted during flight, scavenge pumps 13 and 14 are mounted at opposite ends of the crank case for withdrawing therefrom the oil which may flow or drain from the engine parts. For example, scavenge pump 13 may be mounted at the forward end of the crank case for withdrawing oil therefrom during times when the aircraft is in a dive and the nose of the craft is depressed so that oil drains to the forward end of the crank case. Scavenge pump 14 is mounted at the after end of the crank case for removing therefrom oil which may flow to that portion of the crank case during periods when the aircraft is climbing. Each of the scavenge pump 13 and 14 is directly connected to the aircraft engine so that motive power for these pumps is supplied by the engine of which they are a part. Scavenge pump 13 discharges into a discharge line 15 into which is connected the discharge line 16 for the scavenge pump 14.

The drawings illustrate the aircraft engine as a radial type engine having a multiple number of power take-offs at one end thereof on which may be mounted the generator for the engine, the lubricating oil pump, and other devices for driving actuating means for the various parts of the aircraft mechanism. Also mounted on the end of the aircraft engine and driven by the power take-off mechanism is a centrifuge mechanism comprising a casing 17 defining a volute chamber 18 having a discharge port 19. The casing is provided with an annular bolting flange 21 having the requisite number of bolt holes for the admission of cap screws 22 therethrough for securing the casing to the end wall of the aircraft engine. Journaled in the casing 17 is a shaft 23 which extends through the end wall of the aircraft engine and is suitably connected to the power take-off mechanism.

The casing 17 is of generally cylindrical shape except where the casing wall is extended outwardly to form the volute chamber 18. Mounted within the casing in concentric relation thereto and supported upon a hub 24 keyed to the shaft 23 is a centrifuge 25. The centrifuge 25 comprises a rotor having a generally cylindrical wall 26 which flares outwardly to the point of discharge into the volute chamber 18. At the inlet end of the centrifuge the wall 26 extends inwardly toward the shaft 23 to define, by means of an annular axial flange 27, an intake port 28. An end plate 29 forms a closure member for the end of the centrifuge opposite the intake port. It will be noted that the hub 24 comprises two sections, one of which, as shown at 24a, is provided with an annular flange 31 extending laterally from the hub 24a in the plane of the end plate 29. The end plate 29 is provided with a central opening to provide access to a ball valve cage 32 within the rotor, the annular flange 31 forming the closure member for the opening and being secured to the end plate 29 by means of screws engaging through overlying portions of the flange and the end wall. Between the hub 24 and the cylindrical wall 26 is an annular separating chamber 30, this chamber being being divided by a plurality of radially extending rotor vanes 33. Each of these vanes extends radially from the hub 24 to the cylindrical wall 26 and axially from the intake end of the centrifuge to the end plate 29, except as interrupted to provide for mounting the valves presently to be described.

At the point where the wall of the casing 17 is extended outwardly to form the volute chamber 18 the rotor vanes 33 are elongated to form tangentially inclined pumping vanes 34. In the construction illustrated there may be as few as four rotor vanes which extend radially from the hub 24, whereas the greater area of the centrifuge adjacent its perimeter permits a number of auxiliary pumping vanes 35 to be mounted between the pumping vanes 34. Each of the pumping vanes extends first generally radially and then curves abruptly in a more tangential direction, so that the inner ends of adjacent vanes are separated by a distance greatly exceeding the distance between the vanes at the point where the outer end of one vane overlies the inner end of the next adjacent vane. The pumping vanes define with the cylindrical wall 26 and end plate 29 impeller passages 36, communicating at their inner ends with the separating chambers 30 disposed between the rotor vanes 33 of the centrifuge, and at their outer ends with the volute chamber 18 into which liquid acted upon by these vanes is discharged. It will be noted that at their inner ends the pumping vanes 35 extend axially of the rotor for a distance in excess of the axial length of these vanes at the point of discharge into the volute chamber 18. By reason of this construction the path of liquid flowing along the outwardly flared wall 26 leads directly into the impeller passages 36 between the pumping blades.

It will be noted that the shaft 23 is provided with a longitudinal central passage 37 extending from the inner end of the shaft to a point adjacent the annular flange 31. Adjacent the inner end of the shaft, within the housing for the aircraft engine 10, a plurality of holes 38 are drilled transversely of the shaft to provide communication between the longitudinal passage 37 and the interior of the engine housing. Adjacent the annular flange 31 a pair of diametrically opposite ports 39 are drilled transversely through the shaft 23 to provide communication between the longitudinal passage 37 and the separating chambers 30 within the centrifuge 25. The outer ends of the ports 39 may be chamfered to provide seats 41 for valves which are operable to close these ports.

Affixed to the end plate 29 and to the hub 24 are cages 32 which enclose valve balls 42 for controlling the flow of fluids through the ports 39. In the construction illustrated in the drawings the valve balls 42 are preferably made of aluminum or other metal having similar characteristics, and are of hollow construction, the outer surface of each ball being plated with chromium or otherwise treated to provide a hardened surface and to prevent corrosion. The balls are of such size relative to the cages 32 that each is permitted to move away from the seat 41 under the influence of centrifugal force, the cages holding the balls in line with the ports for proper valve action.

Each of the valve balls 42 is of such weight that it will readily float in the liquid being handled by the centrifuge.

In operation, fluid, usually comprising both liquid and gas, is delivered under pressure from the scavenge pumps to the intake port 28 of the centrifuge, whereupon it enters the separating chambers 30 between the revolving blades 33. In these revolving chambers centrifugal separation takes place in which the air, or other gaseous components of the fluid, is forced toward the center of rotation, whereas the liquid component of the fluid flows outwardly to form a ring of liquid on the cylindrical wall 26. The ring of liquid being concentric with the shaft 23, the gaseous component of the fluid takes the form of a cylinder within the liquid ring, the size of the cylinder of air being determined by the volume of air in the chamber. Under conditions presently to be described, the air flows from the separating chamber 30 through the ports 39 into the passage 37 extending longitudinally of the shaft 23, from whence it is allowed to return to the interior of the engine housing through the holes 38 in the shaft 23.

As has been stated, the valve balls 42 are constructed of a metal and provided with a surface finish which will permit them to completely seal the air exhaust ports 39 when they are in the closed position. By reason of the fact that the cage 32 surrounding each ball holds the ball in line with the ports for proper valve action, these balls operate to close and open the ports as they are moved inwardly and outwardly in their respective cages. When the diameter of the cylinder of air in the separating chamber 30 is substantially equal to the distance through the oppositely disposed cages 32, the balls 42, being within a field of relatively great centrifugal force, are thrown outwardly to the extent permitted by the cages, thus opening the exhaust ports 39 to allow the air to pass therethrough. When a sufficient quantity of air is exhausted through the exhaust ports 39 to permit the ring of liquid in the separating chamber 30 to approach the shaft 23, the buoyancy of the liquid presses the valve balls 42 into engagement with the seats 41, thus closing the exhaust ports 39 and preventing the flow of liquid therethrough.

It will be remembered that the fluid entering the separating chamber 30 is under pressure from the scavenge pumps. This pressure creates a corresponding pressure on the cylinder of air in the centrifuge which forces the air from the chamber through the ports 39 whenever the air within the centrifuge is of sufficient volume to permit the balls to move outwardly under the influence of centrifugal force and open the exhaust passages 39.

It will be appreciated that instead of returning the air to the engine housing, as shown in the accompanying drawings, the longitudinal passage 37 may be extended to the outer end of the shaft 23 and the air allowed to flow from the separating chamber in the centrifuge to atmosphere. However, when a device embodying the invention is employed in the lubricating oil circuit for an internal combustion engine, finely divided particles of oil are likely to be carried into the stream of air flowing through the exhaust ports 39, and by returning the air to the engine housing the loss of any quantity of oil which may flow through the air exhaust ports 39 is avoided.

From the centrifuge the liquid component of the fluid is delivered through pipe line 43 to a heat exchanger 44 of conventional design, and from thence through pipe line 45 to the oil storage tank 46, from whence it is withdrawn by the oil pump 12 to be supplied to the working parts of the engine.

Since the fluid is delivered to the centrifuge under pressure created by the scavenge pumps, the fluid will be forced through the centrifuge and through the pipe line 43 without appreciable reduction in pressure. In fact, when fluid is delivered to the centrifuge under low head, the pressure is augmented by action of the pumping blades 34 and 35 and the liquid component of the fluid is delivered away from the centrifuge under a pressure which may exceed that under which the liquid is delivered to the centrifuge.

In Figure 5 is shown a fragmentary sectional elevation of a centrifuge embodying a modification of the structure hereinabove described. This structure may comprise a casing 51 having walls defining a fluid inlet 52, a volute chamber and discharge port (not shown), the last two elements being similar in all respects to the volute chamber 18 and discharge port 19 of the structure shown in Figures 2 and 3. An opening 53 in the outer end of the casing provides access to the interior thereof for convenience in assembling the device, a cover plate 54 therefor being removably attached to the casing as by cap screws 55. A shaft 56 is journaled in the casing 51, the outer end of the shaft being supported by a bearing 57 mounted in the cover plate 54, and the inner end of the shaft being supported by a bearing 58 mounted in the end wall 59 of the casing. The shaft 56 extends through the end wall of the aircraft engine and is suitably connected to the power take-off mechanism.

Mounted within the casing 51 in concentric relation therewith is a centrifuge rotor 61 comprising a hub 62 fitted over the shaft 56 and having driving connection therewith as by a key 63. The centrifuge rotor 61 further comprises a peripheral wall 64 of generally cylindrical shape but flaring outwardly from the inlet end thereof to the point of discharge therefrom into the volute chamber. Adjacent the inlet end of the rotor the wall 64 is turned inwardly toward the shaft to a point intermediate the periphery of the rotor and the shaft, where it is upset to form an annular axial flange 65 defining an intake port 66. At the opposite end of the rotor 61 is provided an end plate 67 secured to the hub 62 and through which driving connection is had between the rotor and that portion of the hub keyed to the shaft 56.

A plurality of rotor blades 71 are disposed within the rotor chamber, each blade extending between the inlet end of the rotor and the end plate 67 and extending radially from the hub 62 to and merging with the peripheral wall 64. At the point of discharge from the rotor chamber into the volute chamber the rotor vanes 71 are elongated and tangentially inclined to form pumping vanes 72 in the manner of and similar in appearance to the tangentially inclined pumping vanes 34 shown in Figure 3. As hereinbefore described in connection with the structure illustrated in Figures 2 and 3, an additional number of pumping vanes 73 are mounted between the rotor vanes 71, each of which is tangentially inclined in the manner hereinbefore described. The pumping vanes 72 and 73 define, with the peripheral wall 64 and the end plate 67, impeller passages 74 communicating at their inner ends with the rotor chamber and at their outer ends with the volute chamber into which the liquid acted upon by these vanes is discharged.

Each of the rotor blades 71 is interrupted adjacent the shaft for a distance along the shaft substantially equal to the axial length of the pumping vanes 72 and 73 which deliver liquid to the volute chamber. Thus, while the rotor chamber is divided by the rotor blades 71 into a plurality of chambers, each of these several chambers has communication with an open area 75 extending annularly of the shaft 56 in the plane of the impeller passages 74 between the pumping vanes 72 and 73.

Provision is made for the escape of gaseous fluid from this area of the rotor chamber by means of a passage 76 extending centrally and longitudinally of the shaft 56 and having communicating therewith transverse passages 77 which open into the annular area 75 and provide exhaust ports for the air trapped within this area by the ring of liquid formed in the rotor chamber. The passage 76 extends from the point of communication with the transverse passages 77 longitudinally of the shaft and opens through the inner end of the shaft into the crank case 11 of the prime mover engine. This passageway 76 for the escape of air and gases from the pressure area within the rotor chamber is purposefully in a long, narrow tubular form because of the flow characteristics of the fluid involved. The gaseous component of the fluids in the rotor chamber, being of very light weight and under pressure, will flow through the tubular passage 76 at high velocities. The liquid involved, usually oil, is much heavier and has viscous properties causing it to cling to the walls of the passage, so that the volume of oil which may escape from the centrifuge through the air exhaust ports 77 and passage 76 is relatively small. By this means a friction trap is provided which, due to the flow characteristics of the fluids involved, permits the escape of the gaseous component of said fluids without the loss of appreciable quantities of the liquid component of said fluid.

In Figure 6 is shown a fragmentary detail embodying a further modification of the structure illustrated in Figures 2 and 3. The structure illustrated comprises a shaft 78 having keyed thereto the hub 79 of a centrifuge rotor 81 of a type illustrated in Figures 2 and 3. The shaft 78 is provided with a central longitudinal passage 82 and transverse passages 83 which provide communication between the longitudinal passage 82 and a pressure area within the rotor chamber.

A centrifugally operated lever type valve mechanism is provided for regulating the flow of fluids through the transverse passages 83, the valve mechanism comprising a valve member 84 mounted on one end of a U-shaped lever 85 pivoted in a boss 86 mounted on the shaft 78. Affixed to the opposite end of the lever 85 and overlying the valve member 84 is a weight 87 which may comprise, in this structure, a thin shell of aluminum so as to be responsive both to the action of centrifugal force and the buoyancy of the liquid which may collect in the rotor chamber. The weight 87, being somewhat distant from the center of rotation, as defined by the center of the shaft 78, is in an area of relatively great centrifugal force. For this reason, whenever the cylinder of air within the rotor chamber is of sufficient volume to permit the weight 87 to swing outwardly, the valve member 84 is unseated from the outer end of the transverse passage 83, thus allowing the air in the rotor chamber to flow through the longitudinal passage 82. As the liquid component of the fluid within the rotor chamber is increased in volume so that the liquid ring approaches the shaft 78, the weight 87 is moved inwardly by said liquid, whereupon the valve member 84 is moved into position to close the transverse passage 83.

Having now described my invention and in what manner the same may be used, what I claim as new and desire to protect by Letters Patent is:

1. In a centrifuge for separating the gaseous and foam content from lubricating oil in an internal combustion engine lubrication system, a casing adapted to be mounted on said engine, a rotor in said casing comprising a peripheral wall defining a rotor chamber, a rotor shaft having an end extending from said casing for driving engagement by an internal combustion engine, a longitudinal passage in said shaft, radial ports in said shaft providing communication between said passage and rotor chamber, radially movable valve means on said shaft for said ports, said valve means having sufficient weight to open said ports by centrifugal force when immersed in said foam content and having sufficient buoyancy to close said ports when immersed in the liquid content of said oil, and a vent port in said extending end of said shaft to vent foam and oil particles through said rotor shaft when said radial ports are open.

2. In a lubrication system for an internal combustion engine having a crank case, a centrifuge, a rotor in said centrifuge comprising a peripheral wall defining a rotor chamber, means for conveying lubricating oil from the crank case of said engine under pressure to said rotor chamber, said rotor having an inlet at one end and discharge passages defined by a plurality of vanes extending tangentially and then radially inwardly from said wall, said centrifuge having a volute sector around said discharge passages in which the area of the volute progressively increases in the direction of flow for receiving liquid flowing through said passages from the rotor chamber, said volute terminating in a peripheral discharge port for the liquid component of said lubricating oil, a shaft in said rotor extending into said crank case, and a central discharge passage in said shaft leading from said rotor chamber for the gaseous component of said oil, said central discharge passage providing communication between said rotor chamber and said engine crank case.

3. In a centrifuge for separating the gaseous and liquid components of an admixture of such components, a casing, a centrifuge rotor mounted in said casing, a shaft for said rotor, a longitudinal passage in said shaft, a vent port in said shaft communicating with said passage exteriorly of said casing, radial ports in said shaft communicating with said passage within said casing, ball valve seats on said radial ports, free floating ball valves associated with said seats, and ball cages carried by said rotor for confining said ball valves for limited movement to open and close said radial ports, said ball valves being movable by centrifugal force to open said ports and being of such a weight as to be moved by buoyancy to close said ports when said casing contains a predetermined volume of liquid.

4. In a lubrication system for an internal combustion engine having a crank case; a centrifuge having a central gas accumulating space, means for supplying oil to said centrifuge under pressure, a rotor shaft in said centrifuge extending into said crank case, a passage extending longitudinally through said shaft, a port in said shaft within said crank case communicating with said passage, and a port in said shaft in said central gas accumulating space within said centrifuge communicating with said passage to vent gas accumulated around said shaft in said centrifuge into said crank case.

5. A centrifuge comprising a casing, a rotor in said casing having a peripheral wall and a pair of end walls defining a rotor chamber, an inlet opening in one end of said casing and one of said rotor end walls, said peripheral wall being connected with said one end wall and spaced from the other end wall to define a peripheral liquid outlet in one end of said rotor chamber, a volute chamber in said casing around said rotor outlet terminating in a tangential discharge port, radial vanes in said rotor having outer ends curved in tangential directions, said rotor being adapted to form a liquid ring against said peripheral wall and separate gas from said liquid in a central space in the rotor chamber concentric with the axis of rotation, and a gas vent passage extending axially into said rotor and having a port in said central space close to the rotor axis and remote from said peripheral wall.

6. In an engine crank case oil centrifuge for separating gaseous and liquid components of an admixture of such components in an oil pressure supply system for an engine; a rotor casing having an inlet for connection with said pressure supply system to maintain said casing under pressure above atmospheric, a tangential liquid component discharge outlet in said casing, a centrifuge rotor in said casing having a central gas accumulating space therein, a shaft for said rotor having an inner end in said gas accumulating space and an outer end adapted to extend into an engine crank case for driving the rotor, a longitudinal passage in said shaft opening through said outer end thereof, radial ports in said shaft connecting said passage with said gas accumulating space to vent the gas component from said space through the outer end of said shaft by the action of the inlet pressure on both of said components in the casing, and radially movable valve means on said shaft for said ports, said valve means having sufficient weight to open said ports by centrifugal force when immersed in said gas component and having sufficient buoyancy to close said ports when immersed in said liquid component.

7. A centrifuge comprising a casing, a rotor in said casing, said rotor having a peripheral wall and a pair of end walls defining a rotor chamber, a shaft for said rotor extending through said chamber, an inlet opening in one end of said casing and one of said rotor end walls, said peripheral wall being connected with said one end wall and spaced from the other end wall to define a peripheral liquid outlet in one end of said rotor chamber, a volute chamber in said casing around said rotor outlet terminating in a tangential discharge port, vanes in said rotor adapted to rotate a liquid in said chamber and form a liquid ring against said peripheral wall to separate gas from said liquid in a central space in the rotor chamber around said shaft, and a gas vent passage extending longitudinally through said shaft and having a port in said shaft communicating with said central space.

References Cited in the file of this patent

UNITED STATES PATENTS

| | | |
|---|---|---|
| 1,143,957 | Hansen | June 22, 1915 |
| 1,230,601 | Reece | June 19, 1917 |
| 1,705,263 | McIlvaine | Mar. 12, 1929 |
| 2,024,336 | Cavanaugh | Dec. 17, 1935 |
| 2,024,703 | Ragsdale et al. | Dec. 17, 1935 |
| 2,107,035 | Hall | Feb. 1, 1938 |
| 2,190,245 | Sartell | Feb. 13, 1940 |
| 2,278,397 | Scheibe et al. | Mar. 31, 1942 |
| 2,379,579 | Hunter | July 3, 1945 |
| 2,417,747 | Flowers | Mar. 8, 1947 |

FOREIGN PATENTS

| | | |
|---|---|---|
| 7,401 | Netherlands | Aug. 15, 1922 |
| 25,761 | Great Britain | of 1909 |
| 232,039 | Germany | Mar. 4, 1911 |
| 258,204 | Great Britain | Sept. 14, 1926 |
| 417,243 | Germany | Aug. 8, 1925 |
| 451,026 | Germany | Oct. 19, 1927 |
| 630,932 | Germany | June 9, 1936 |
| 863,788 | France | Apr. 9, 1941 |
| 874,866 | France | Aug. 28, 1942 |